United States Patent Office 3,527,795
Patented Sept. 8, 1970

3,527,795
PROCESS FOR PREPARING WATER-SOLUBLE SALTS OF ORGANIC PHOSPHORUS ACIDS
Roger A. Rose, St. Louis, Mo., assignor to Monsanto Company, St. Louis, Mo., a corporation of Delaware
No Drawing. Filed Nov. 20, 1967, Ser. No. 684,525
Int. Cl. C07f 9/38; C11d 1/00
U.S. Cl. 260—502.4                        7 Claims

ABSTRACT OF THE DISCLOSURE

This invention relates to a process for preparing a stable, free-flowing particulate water-soluble composition such as the sodium salts of 1-hydroxy ethylidene diphosphonic acid and ethylene-1,1-diphosphonic acid. This process more specifically comprises the steps of intimately admixing, for example, by periodic agitation and at a rate sufficient to maintain resulting reaction mass in a substantially solid and particulate form, a liquid diphosphonic acid, having a concentration at 20° C. of about 50% to about 80% by weight, and an alkali metal-containing material such as sodium carbonate which is in the form, for example, of soda ash, to form a free-flowing granulated material. The ratio of alkali metal to acid is in the range of 1:1 to 4:1. The resulting granular material is preferably aged for from about 2 seconds to about 5 minutes and then heated for from about 5 minutes to about 2 hours at a temperature of from about 100° C. to about 200° C. to form a substantially anhydrous salt. The particle size of the resultant salt is characterized by having at least 90% by weight of all the particles remain on a No. 100 mesh U.S. Standard screen.

---

The present invention relates to novel processes for preparing water-soluble salts of liquid organic phosphorus acids and more particularly relates to the preparation of the sodium and potassium salts of 1-hydroxy ethylidene diphosphonic acid (hereinafter referred to as HEDP) and ethylene-1,1-diphosphonic acid (hereinafter referred to as EDP), all of which salts are characterized by having a particle size such that at least 90% by weight of all the particles remain on a No. 100 mesh U.S. Standard screen.

The use of builders as adjuncts to soap and synthetic detergents, and the property which some materials have of improving detergency levels of such detergent compounds are well known phenomena. The phenomena are widely appreciated but the exact behavior and mechanics of how builders perform their function has never been fully explained. While many explanations for the behavior of builders may be found, there still has not been determined a set of criteria which would permit one to accurately predict which compounds actually possess builder properties.

This may be explained, in part, by the complex nature of detergency itself and the countless factors which are conceptually involved. Among the many facets of built detergency systems in which builder materials are thought to have some effect are such factors as stabilization of solid soil, suspensions, emulsification of soil particles, the surface activity of the aqueous detergent solution, solubilization of water-insoluble materials, foaming or suds producing characteristics of the washing solutions, peptization of soil agglomerates, neutralization of acid soil and sequestration of mineral constituents present in the washing solution tending to "harden" it. There might be mentioned many other areas in which a builder material might be of some assistance. The point is that no general basis has been found either as regards physical properties or chemical structure on which one might predict the behavior of chemical materials as overall detergency builders.

Among the builder materials described in the prior art, are water-soluble inorganic alkaline builder salts which are used alone or in combination. Examples are alkali metal carbonates, borates, phosphates, polyphosphates, bicarbonates and silicates.

Examples of organic builder compounds known heretofore and which also can be used alone and in combination are alkali metal, ammonium or substituted ammonium aminopolycarboxylates, e.g., sodium and potassium ethylenediaminetetraacetate, sodium and potassium N-(2-hydroxyethyl)-ethylenediaminetriacetate, sodium and potassium nitrilotriacetate and sodium, potassium and triethanol-ammonium-N-(2 - hydroxyethyl) - nitrilodiacetate. Alkali metal salts of phytic acid, e.g., sodium phytate are also suitable as organic builders.

Additional examples of organic builder compounds are those generally known in the art as diphosphonic acid and ethylene-1,1-diphosphonic acid; note, for example, U.S. Pats. 3,122,417; 3,149,151; 3,159,581; 3,202,579; 3,213,129; and 3,214,454 all of which publications are incorporated herein by reference.

An ever-increasing interest in builder materials has resulted in an expanding list of compounds which when used in conjunction with known cleaning agents serve to enhance the cleaning performance of such detergents. This increased interest has brought about the fuller appreciation that improved builders are highly desirable to avoid certain limitations and disadvantages of prior art builder materials.

When the diphosphonic acids are utilized in a dry detergent formulation, they are usually in the form of their water-soluble salts. The solid acid form is not compatible with the alkaline ingredients normally present in the dry-detergent formulations and such a formulation which contains the dry acid is unstable. This instability manifests itself, for example, in that caking results and there is a slow interaction thus changing the composition. While it has been suggested in the past as represented by the above-described patents that, for example, salts such as the sodium salts of 1-hydroxy ethylidene diphosphonic acid can be prepared by treating the acid with either a solid or liquid alkaline material, theer are certain disadvantages in such interactions. In the utilization of a liquid alkaline solution such as sodium hydroxide, the resultant neutralization process yields a solution from which excess water must be removed by evaporation and consequently there is required a drying step of the resultant solid material and also a grinding step. When a solid alkaline material is utilized in treating the acid the resultant neutralization reaction results in a formation of first a wet fluid phase which quickly is transformed into a thick paste which ultimately hardens into a solid mass. Consequently, in order to incorporate these prior art water-soluble salts of the diphosphonic acids into a dry detergent formulation, the above-described solid mass must be comminuted by mechanical means in order to form a free-flowing product. Such comminution usually results in the end product having very small particles, for example, 40% to 80% of said particles usually pass through a No. 200 mesh U.S. Standard screen. Furthermore, usually about 20% of said particles will pass through a No. 325 mesh U.S. Standard screen. (However, under certain circumstances, it is desirable to have a particle size such that less than 10% of all the particles will pass through a No. 100 mesh U.S. Standard screen.)

Although the water-soluble salts of the diphosphonic acids, produced by the prior art processes, may be employed in bleaching, sterilizing, oxidizing, and disinfecting operations, these materials possess certain disadvantages in handling and processing since many of the particles are so small or fine they behave as dust. Thus, during the processing and use of these materials special equipment must be employed to overcome or eliminate the hazards inherent in dust formulation such as health hazards to personnel handling these water-soluble salts as fine particles or dust. Such health hazards could result from the inhalation or breathing of the "dust" of the finely divided water-soluble salt materials unless appropriate measures such as special ventilating systems or protective respiratory equipment is used. Another disadvantage with the dusty or extremely fine prior art material is that it is characterized by having a high density which renders the material less suitable for use in the present-day low density detergent formulations. Specifically, such material will stratify or form layers of different ingredients in the packaged product with the result that the formulation is not uniform in composition in all proportions of the container or package. Although larger particles of the water-soluble salts of the diphosphonic acids can be prepared by mechanical means, such procedures are expensive and do not avoid some of the difficulties referred to above.

Accordingly, it is an object of the present invention to provide a novel process which overcomes the aforementioned disadvantages in the prior art processes and results in the production of water-soluble salts of the diphosphonic acids and which salts are characterized by having comparatively large particle size.

It is a further object of the present invention to provide an improved process for producing said water-soluble salts and which salts are characterized by having a particle size distribution such that at least 90% by weight of the particles remain on a No. 100 mesh U.S. Standard screen, said salts thus containing a small percentage or minimum of dust or fines.

It is also an object of the present invention to prepare water-soluble salts of 1-hydroxy ethylidene diphosphonic acid and ethylene-1,1-diphosphonic acid and which salts are characterized by having a particle size wherein substantially all the particles pass through a No. 10 mesh U.S. Standard screen and at least 90% of said particles are retained on a No. 100 mesh U.S. Standard screen.

Still further objects and advantages of the present invention will become apparent to those skilled in the art in view of the subsequent description and appended claims.

It has now been surprisingly discovered that the water-soluble salts of certain diphosphonic acids such as those which fall within the structural Formula I, hereinafter set forth, can be prepared by a novel process wherein the acid material and the alkaline material are intimately admixed under controlled conditions so that the resultant reaction mass is substantially always in a free-flowing, solid and particulate form and which yields an end product which has a substantially large particle size, i.e., at least 90% of all of the particles remain on a No. 100 mesh U.S. Standard screen, as contrasted to the salt products produced by the prior art processes.

The novel processes of the present invention generally comprise the intimate admixing, for example, by periodic agitation, at a rate sufficient to maintain the resulting reaction mass in a substantially solid and particulate form, (1) a liquid organic phosphorous acid compound having the formula:

$$(OH)_2=P\overset{O}{\underset{}{\|}}-\left[\begin{array}{c}X\\|\\C\\|\\Y\end{array}\right]_n-\overset{O}{\underset{}{\|}}P=(OH)_2 \quad (I)$$

wherein $n$ is an integer from 1 to 10, X is a member selected from the group consisting of hydrogen, alkyl, and halo-substituted alkyl, said alkyl group containing from 1–6 carbon atoms, and Y is a member selected from the group consisting of hydrogen, hydroxyl, alkyl, and halo-substituted alkyl, said alkyl group being from 1–6 carbon atoms, and (2) an alkali metal-containing material such as sodium carbonate to form a free-flowing granulated salt form of the acid falling within the above-described Formula I. The resultant salt then undergoes an aging process for a period of about 2 seconds to about 2 hours followed by a heating step which is conducted at a temperature range of between about 100° C. and the melting and/or decomposition temperature of the particular salt. The substantially anhydrous, stable water-soluble salt thus formed is characterized by having a particle size range such that substantially all the particles pass through a No. 10 mesh U.S. Standard screen and at least 90% thereof are retained on a No. 100 mesh U.S. Standard screen.

As examples of the liquid organic phosphorous acids, i.e., the diphosphonic acids, which may be utilized in the present invention and which fall within the above-described Formula I, there may be included:

(1) Methylenediphosphonic acid, $$(OH)_2(O)PCH_2P(O)(OH)_2$$

(2) Ethylidenediphosphonic acid, $$(OH)_2(O)PCH(CH_3)P(O)(OH)_2$$

(3) Isopropylidenediphosphonic acid, $$(OH)_2(O)PCH(CH_2CH_3)P(O)(OH)_2$$

(4) 1-hydroxy, ethylidenediphosphonic acid, $$(OH)_2(O)PC(OH)(CH_3)P(O)(OH)_2$$

(5) Hexamethylenediphosphonic acid, $$(OH)_2(O)PCH_2(CH_2)_4CH_2P(O)(OH)_2$$

(6) Trimethylenediphosphonic acid, $$(OH)_2(O)P(CH_2)_3P(O)(OH)_2$$

(7) Decamethylenediphosphonic acid, $$(OH)_2(O)P(CH_2)_{10}P(O)(OH)_2$$

(8) 1-hydroxy, propylidenediphosphonic acid, $$(OH)_2(O)PC(OH)(CH_2CH_3)P(O)(OH)_2$$

(9) 1,6-dihydroxy,1,6-dimethyl, hexamethylenediphosphonic acid, $$(OH)_2(O)PC(CH_3)(OH)(CH_2)_4C(CH_3)(OH)P(O)(OH)_2$$

(10) 1,4-dihydroxy,1,4-diethyl, tetramethylenediphosphonic acid, $$(OH)_2(O)PC(C_2H_5)(OH)(CH_2)_2C(C_2H_5)(OH)P(O)(OH)_2$$

(11) 1,3-dihydroxy,1,3-dipropyl, trimethylenediphosphonic acid, $$(OH)_2(O)PC(C_3H_7)(OH)(CH_2)C(C_3H_7)(OH)P(O)(OH)_2$$

(12) 1,4-dibutyl, tetramethylenediphosphonic acid, $$(OH)_2(O)PCH(C_4H_9)(CH_2)_2CH(C_4H_9)P(O)(OH)_2$$

(13) Dihydroxy, diethyl, ethylenediphosphonic acid, $$(OH)_2(O)PC(OH)(C_2H_5)C(OH)(C_2H_5)P(O)(OH)_2$$

(14) Tetrabutyl, butylenediphosphonic acid, $(OH)_2(O)P[CH(C_4H_9)]_4P(O)(OH)_2$

(15) 4-hydroxy,6-ethyl, hexamethylenediphosphonic acid $(OH)_2(O)PCH_2CH_2CH_2CH(OH)$
$CH_2CH(C_2H_5)P(O)(OH)_2$ Of the above-described acids and other acids falling within Formula I which can be used in the process as described herein, the preferred acids utilized in the present invention processes are HEDP and EDP.

One of the critical features of the present invention is the utilization of a liquid diphosphonic acid, i.e. an aqueous solution containing a diphosphonic acid, falling within Formula I, which has a concentration at 20° C. of at least 47% by weight, preferably from about 50% to about 80% by weight. It has been observed that at acid concentrations below 47% by weight, it is difficult to maintain the total resulting reaction mass in a solid and particulate form. Furthermore, an undesirable amount of agglomeration occurs if too much water is present. It is theorized that at acid concentrations above about 80% by weight, there is an insufficient amount of water present to form a fluid phase and thus there would only be a slow reaction rate. When too little water is present not enough agglomeration occurs to "remove" the fines or small particles. It is to be understood, of course, that the applicant does not wish to be limited in any way whatsoever by any of the theories expounded herein and that such theories are merely ideas as to what may happen and the exact reasons are not explainable at the present time.

Of the numerous alkaline materials suggested in the past for the preparation of the water-soluble salts of the acids heretofore described and any others falling within Formula I, it has presently been found that only the sodium and potassium carbonates and bicarbonates (including sodium sesquicarbonate) are suitable for the intimate admixing (under controlled conditions) with the above-described acids in order to form the free-flowing, granulated salt form of said acids and which have the characteristics herein set forth. It is to be understood then that the term "alkali metal-containing material" refers to the carbonates, bicarbonates and sesquicarbonate heretofore set forth. One of the preferred forms of the alkali metal-containing material is the commercially available "soda ash" which contains generally at least 75%, preferbly from about 90% to about 99.8%, by weight of sodium carbonate. The sodium and potassium carbonates, bicarbonates and sesquicarbonate utilized in the present invention processes are substantially in a dry or anhydrous condition, i.e., contain less than 1% by weight water, and have a particle size wherein at least 40%, preferably from about 50% to about 80%, of all the particles remain on a No. 100 mesh U.S. Standard screen. While the upper limit of a particle size of the carbonates, bicarbonates and sesquicarbonate can be of almost any size, for example, ⅛″ in spherical diameter to approximately 2″ in diameter or greater, it is preferred that these materials have a particle size range wherein substantially all of the particles pass through a No. 4 mesh U.S. Standard screen and at least 4% thereof remain on a No. 100 mesh U.S. Standard screen.

The amount of ingredients utilized in the present invention processes to prepare the water-soluble salts of the acids falling within the above Formula I are sufficient stoichiometric quantities to produce the particular salt desired, for example the mono-, di-, tri- or tetra-sodium salt of HEDP. It is preferred that the amount of alkali metal to acid mole ratio be within the range of from 1:1 to about 4:1. For example, where one desires to prepare the tetrasodium salt of HEDP, it is necessary to use 4 sodium atoms (for example, as two moles of $Na_2CO_3$) per mole of HEDP. By the same token, it is also within the scope of the present invention to prepare a mixture of salts such as a mixture of the trisodium salt and tetrasodium salt of HEDP by using the sodium containing material such as $Na_2CO_3$ and HEDP in amounts such that the mole ratio of Na:HEDP is from about 3:1 to about 4:1, preferably from about 3.2:1 to about 3.8:1. It is to be understood, of course, that mixtures of either sodium and/or potassium salts can be prepared by the processes described herein.

Referring now more particularly to the individual steps of the novel processes of the present invention, the first step generally comprises the intimate admixing of a diphosphonic acid falling within the above Formula I and the alkali metal-containing material in such proportions and at a rate sufficient to maintain the resulting reaction mass in a substantially solid and particulate form. While such admixing can be accomplished satisfactorily by concurrently adding, with periodic or continuous stirring or agitation, both the acid and the alkali material to a reaction vessel, it is preferred that the acid be added in small increments and over a period of time (and preferably in such a manner as to uniformly apply such acid) to the bulk of the carbonate material being treated. It is a necessary requirement that the carbonate material be periodically and/or frequently (preferably continuously) agitated during such addition. It has been observed during the experimentation of the present invention that when the total quantity of acid and carbonate material are mixed together at one time there first results the formation of a wet fluid mass which quickly turns into a "stiff" paste. This paste then finally forms a hard or solid mass which must be comminuted, for example, in a ball mill in order to obtain a material which will flow freely. Such comminution results in the final salt formed being characterized by having a large quantity of small particles, i.e., which pass through a No. 100 (even No. 200) mesh U.S. Standard screen. Consequently, in order to achieve the desired particle size of the salt of the acid falling within Formula I, it has been found necessary to add only small or incremental amounts of the acid to the carbonate material in order to maintain the resultant reaction mass in a substantially free-flowing condition, which results in a solid and particulate product.

In conjunction with the intimate admixing of the acid and carbonate material, it is necessary that after an incremental amount of the acid is added to the carbonate material that an aging step be carried out in order to insure that a complete reaction between the two materials has been completed. More specifically, it is desirable that this aging be carried out over a period from about 2 seconds to about 2 hours or longer depending, of course, upon the amount of carbonate material being treated; preferably such aging period extends over the range of from about 2 seconds to about 5 minutes. This aging step is carried out under conditions such that the carbonate material is periodically or continuously agitated thus aiding in the prevention of the formation of a paste or a wet fluid mass phase. It is also desirable after the final addition of the acid to the carbonate material that a similar aging step be conducted as heretofore described.

It is generally desirable that the reaction between the acid and the above-described carbonate material be carried out under atmospheric pressure; however, if one so desires, both subatmospheric and superatmospheric pressures can be utilized.

It has been noted during the experimentation on the present invention that the addition of the acid to the carbonate material is an exothermic one wherein the temperature, particularly of the local carbonate material reacting with the acid, rises. Consequently, it is desirable to control the temperature of the reaction of the ingredients. It is desirable that the carbonate material, during the entire reaction time, be at a temperature range between about 5° C. and 95° C., preferably between 10° C. and 40° C.

The exact means of intimately admixing the acid and carbonate material to form the salt is not critical and any particular mixing means can be utilized. For example, such admixing may be accomplished by merely dropping the acid in small increments into the overall body of the carbonate material being treated and which is periodically or continuously agitated. By the same token, the carbonate material may be positioned in a rotating cylinder (or a ribbon blender) and the acid sprayed into the interior thereof at a continuous or intermittent rate while the mixer is continuously being rotated. By the same token, the acid can be sprayed onto a moving bed or into a fluidized bed of the carbonate material.

In conjunction with the reaction between the acid and carbonate material heretofore described, it has been observed during the experimentation of the present invention that there is a certain amount of gaseous material evolved. This gaseous material has been analyzed to be substantially carbon dioxide and water vapor. It is theorized that due to the local reaction between the acid and carbonate material and the resultant evolution of carbon dioxide, the carbon dioxide aids in the formation of light-density agglomerates of the resultant salt and consequently aids in the production of a free-flowing, solid and particulate form of salt which has a particle size characteristic herein described.

While it is believed that water is formed from the reaction between the acid and carbonate material, it has been observed in the experimentation conducted on this invention that substantially no free water is present in the resulting reaction mass. Since there is formed a free-flowing salt, it is believed that substantially all of the water present in the reaction mass is in a form of water of hydration and that other water which is formed or is already present from the acid solution is driven off, for example, by evaporation due to the heat of reaction. In other words, the reaction mass is substantially always in the form of a free-flowing material and does not pass through or form an over-all wet fluid mass phase and then finally a hard paste, a case which would require comminution as previouslyt mentioned and thus result in the formation of small particles, i.e. which would pass through a No. 100 mesh U.S. Standard screen.

As previously mentioned, the free-flowing, solid and particulate water-soluble salt of the particular diphosphonic acid may contain water in the form of water of hydration and minor amounts of carbon dioxide. In such cases and where it is desirable to utilize a substantially anhydrous salt, a drying step is provided wherein the freshly prepared water-soluble salt is preferably heated at a temperature of from about 100° C. to about 200° C., more preferably from about 150° C. to 195° C., for a period sufficient to remove the water of hydration and $CO_2$. This heating period generally extends over a range of from about 5 minutes to about 10 hours or more. It is preferable, however, that the heating period be carried out over a range of from about 5 minutes to about 2 hours.

While the present invention processes heretofore set forth have been generally directed to a batchwise process for preparing the water-soluble salts of the diphosphonic acids falling within the above Formula I, it is also within the scope of the present invention to prepare such salts on a continuous basis. More specifically and for exemplary purposes, there is provided a continuous process for the preparation of a stable, free-flowing water-soluble salt of diphosphonic acid wherein a liquid diphosphonic acid falling within the above Formula I is continuously contacted, e.g., sprayed, on a moving, fluidized bed of carbonate material. For example, the carbonate material can be conveyed on an endless conveyor, the depth of the carbonate bed being sufficiently small in order to promote an effective liquid-solid contact. The amount of acid utilized per unit of time is that amount which is stoichiometrically required to react with that portion of the moving bed which it comes in contact with, the alkali metal:acid mole ratio being from about 1:1 to 4:1. After the carbonate material has been initially contacted with said acid, it continues to undergo fluidization in order, for example, to prevent hard agglomerates forming in the resultant reaction mass and also to aid in the completion of the reaction between the acid and the carbonate material. The resultant free-flowing water-soluble salt, which is in a solid and particulate form, is then additionally aged for a period (such as those aging periods heretofore set forth) prior to undergoing further processing steps. This aging step may, for example, be carried out merely due to the time lapse in the transfer of the material from that point where it initially is contacted with the acid to that point at which it undergoes, where one desires, a heating step also conducted under the conditions heretofore set forth.

As an alternative to the use of an endless conveyor, the carbonate material which is contacted with the acid, may be fluidized by the utilization of a longitudinally extending rotating cylinder which has, for example, a series of flights or a single helix positioned on the interior wall portion of said cylinder. Thus the carbonate material is fluidized and moved forward due to the particular mechanical design of such cylinder. It is to be understood, of course, that various mechanical devices may be utilized in carrying out a continuous process for the formation of the water-soluble salts. Furthermore, various types of heating equipment may be utilized for removing the water of hydration present in the freshly prepared granulated salt material.

In a preferred embodiment of the present invention there is provided a process for preparing a mixture of the trisodium and tetrasodium salts of HEDP and which mixture has a pH, as measured by dissolving 1 gram thereof in 100 cc. of water which is at 20° C., of from about 10.0 to about 11.0. Such process comprises the steps of adding incremental amounts of HEDP to sodium carbonate over an extended period of time and at such a rate so as to maintain the resulting reaction mass in a free-flowing, solid and particulate form. The mole ratio of sodium to HEDP is from about 3.2:1 to about 3.8:1. During each incremental addition of HEDP and for a period of from about 2 seconds to about 5 minutes thereafter, the sodium carbonate is periodically agitated. After the final incremental addition of HEDP and agitation period, the resultant salt mixture is aged for a period of from about 2 seconds to about 5 minutes. The aged salt mixture is then heated for a sufficient period of time such as about 5 minutes to about 2 hours to remove substantially all the water of hydration contained therein to form a substantially anhydrous mixture of the trisodium and tetrasodium salts of HEDP, said mixture being characterized by having a particle size range wherein less than 1% of the particles remain on a No. 10 mesh U.S. Standard screen and at least 90% of the particles remain on a No. 100 mesh U.S. Standard screen.

A further understanding of the processes of the present invention will be obtained from the following examples which are intended to illustrate the invention but not to limit the scope thereof, parts and percentages being by weight unless otherwise specified.

EXAMPLE I

The preparation of the trisodium salt of 1-hydroxy ethylidene diphosphonic acid was carried out in the following manner. Approximately 100 grams of a light soda ash were placed in a 600 cc. beaker. This soda ash analyzed approximately 99% by weight $Na_2CO_3$ and had a particle size such that 50% by weight of all the particles passed through a No. 100 mesh U.S. Standard screen. Approximately 216 grams of an aqueous solution of 1-hydroxy ethylidene diphosphonic acid having a concentration of 60% by weight were added in 5 cc. increments to the soda ash over a period of approximately 5 minutes and at 15 second intervals therebetween. (The Na:HEDP mole ratio was approximately 3:1.) During the time that this acid was added to said soda ash, the soda ash was stirred vigorously with a stainless steel spatula. It was noted that after adding each increment of acid that the reaction bubbled up locally and released a gas which was analyzed to be carbon dioxide. The overall mass remained essentially a particulate solid throughout the entire reaction time. At the end of the overall reaction, i.e. after all the acid had been added, the resulting salt was aged for 3 minutes. A total of approximately 273 grams of solids were recovered and the solids analyzed to be the trisodium salt of the above-described acid. A 1 gram sample portion of the trisodium salt was dissolved in 100 cc. of distilled water having a temperature of 20° C.; and pH of the resulting solution was measured to be approximately 7.3. The trisodium salt was characterized by being substantially free-flowing, having a granular appearance, and having a particle size range whereby only 0.5% of all the particles remained on a No. 10 mesh U.S. Standard screen and 94% of all particles remained on a No. 100 mesh U.S. Standard screen.

The above-described trisodium salt of 1-hydroxy ethylidene diphosphonic acid was also analyzed to contain approximately 30% by weight of water of hydration. A 50 gram sample of such trisodium salt was placed in an evaporating dish which was then placed in an oven which was maintained at a temperature of 165° C. The 50 gram sample remained in the oven for approximately 4½ hours. Periodically during this 4½ hour heating time, a small portion of the trisodium salt sample was removed and analyzed for moisture content. At the end of 4½ hours, the moisture content had stabilized at less than 1.0% by weight and then the anhydrous trisodium salt was removed from the oven. This anhydrous trisodium salt exhibited a free-flowing characteristic and was of very light color, i.e. substantially white in color. The particle size was substantially the same as that material exhibited prior to heating.

In order to vividly illustrate the criticality of preparing the water-soluble salt of 1-hydroxy ethylidene diphosphonic acid by the novel processes described herein, the above-described Example I was repeated in the following manner. Approximately 216 grams of the above-described 1-hydroxy ethylidene diphosphonic acid (liquid form) were placed in a 600 cc. beaker. To the liquid acid in said beaker was added at one time approximately 100 grams of the soda ash heretofore described. The two ingredients were continuously agitated with a stainless steel spatula. The resultant reaction mass formed a wet fluid phase first and then a paste which was difficult to stir and then finally the material agglomerated to such an extent that it formed a solid and hard mass. The resultant hard material was then aged for a period of approximately 3 minutes and then was ground up in a pedestal with a mortar and then dried for a period of 6 hours at 165° C. to a constant moisture content. The particle size of the dried trisodium salt of 1-hydroxy ethylidene diphosphonic acid was such that approximately all the particles passed through a No. 200 mesh U.S. Standard screen and only 50% of the particles were retained on a No. 325 mesh U.S. Standard screen. It can readily be seen that in view of the repeated Example I that mere neutralization of a diphosphonic acid with an alkaline material, such as suggested by the prior art, does not result in the preparation of a large particle size water-soluble salt.

EXAMPLE II

The procedure set forth in Example I was repeated with the exception that in place of the light soda ash there was substituted an equivalent amount of potassium carbonate. The resultant product, both before and after heating, was the tripotassium salt of 1-hydroxy ethylidene diphosphonic acid which was characterized by having the same particle size range, color and free-flowing characteristics as the trisodium salt heretofore described in Example I.

EXAMPLE III

The preparation of the trisodium salt of ethylene-1, 1-diphosphonic acid was carried out in the following manner. Approximately 100 grams of a light soda ash were placed in a 600 cc. beaker. This soda ash analyzed approximately 99% by weight $Na_2CO_3$ and had a particle size such that 50% by weight of all the particles passed remained on a No. 100 mesh U.S. Standard screen. Approximately 200 grams of an aqueous solution of ethylene-1, 1-diphosphonic acid having a concentration of 60% by weight were added at 5 cc. increments, at 15 second intervals, to the soda ash over a period of approximately 5 minutes. (The Na:EDP mole ratio was approximately 3:1.) During the time that this acid was added to said soda ash, the soda ash was stirred vigorously with a stainless steel spatula. It was noted that after adding each increment of acid that the reaction bubbled up locally and released a gas which was analyzed to be carbon dioxide. The overall mass remained essentially a particular solid throughout the entire reaction time. At the end of the overall reaction, i.e. after all the acid had been added, the resulting salt was aged for 3 minutes. A total of approximately 255 grams of solids were recovered and the solids analyzed to be the trisodium salt of the above-described acid. A 1 gram sample portion of the trisodium salt was dissolved in 100 cc. of distilled water having a temperature of 20° C.; the pH of the resulting solution was measured to be approximately 7.8. The trisodium salt was characterized by being substantially free-flowing, having granular appearance, and having a particle size range whereby 0.9% of the particles remained on a No. 10 mesh U.S. Standard screen and 93% of all particles remained on a No. 100 mesh U.S. Standard screen.

The above-described trisodium salt of ethylene-1,1-diphosphonic acid was also analyzed to contain approximately 26% by weight of water of hydration. A 50 gram sample of such trisodium salt was heated in the manner set forth and described in Example I. The 50 gram sample remained in the oven for approximately 4 hours. Periodically during this 4 hour heating time, a small portion of the trisodium salt sample was removed and analyzed for moisture content. At the end of 4 hours, the moisture content had stabilized at about 0.85% by weight; the anhydrous trisodium salt was then removed from the oven. This anhydrous trisodium salt exhibited a free-flowing characteristic and was of very light color, i.e., substantially white in color. The particle size was substantially the same as that material exhibited prior to heating.

EXAMPLE IV

Various water-soluble salts of those acids listed in Table 1 were prepared by the procedure set forth in the above Example I. The products formed, the particle size distribution and pH thereof are also listed.

In view of the foregoing examples, it can readily be seen that free-flowing, large particle size, water-soluble salts of various diphosphonic acids can be prepared by the novel processes described herein. Furthermore, these salts exhibit an alkaline pH range which when incorporated with other ingredients of a similar pH range results in a highly stable dry detergent formulation. Furthermore, such formulations, when stored in containers, do not exhibit any stratification of ingredients therein.

The foregoing description of the invention has been presented describing certain operable and preferred embodiments. It is not intended that the invention should be so limited since variations and modifications thereof will be obvious to those skilled in the art, all of which are within the spirit and scope of this invention. It is to be understood that the appended claims constitute part of the de-

TABLE I

| Acid | Carbonate | Na:Acid mole ratio | Water of hydration, percent | Product formed | Particle Size Distribution of Dried Salt | | pH[1] |
| --- | --- | --- | --- | --- | --- | --- | --- |
| | | | | | Percent on No. 10 mesh | Percent on No. 100 mesh | |
| Methylene diphosphonic | $Na_2CO_3$ | 4:1 | 28 | Tetrasodium salt | 0.8 | 90 | 10.3 |
| Dimethylene diphosphonic | $Na_2CO_3$ | 2:1 | 18 | Disodium salt | 0.9 | 98 | 8.4 |
| Trimethylene diphosphonic | $Na_2CO_3$ | 3:1 | 24 | Trisodium salt | 0.4 | 96 | 9.8 |
| Hexamethylene diphosphonic | $Na_2CO_3$ | 4:1 | 26 | Tetrasodium salt | 0.6 | 97 | 10.6 |
| HEDP | $Na_2CO_3$ | 3.5:1 | 24 | Equal mixture of trisodium and tetrasodium salts. | | | 10.0 |
| HEDP | $Na_2CO_3$ | 4:1 | 25 | Tetrasodium salt | 0.5 | 94 | 10.4 |
| HEDP | $Na_2CO_3$ | 1:1 | 16 | Monosodium salt | 0.3 | 93 | 7.8 |
| EDP | $Na_2CO_3$ | 4:1 | 29 | Tetrasodium salt | 0.7 | 93 | 10.5 |
| EDP | $Na_2CO_3$ | 1:1 | 14 | Monosodium salt | 0.9 | 96 | 8.1 |

[1] Basis: 1 gm. of dried salt dissolved in 100 cc. water at 20° C.

What is claimed is:

1. A process for preparing a stable, free-flowing, particulate, water soluble composition which process comprises slowly adding with intimate admixing and ageing, and at a rate sufficient to maintain the resulting reaction mass in a substantially solid and particulate form, an aqueous solution containing 47% to 80% of a phosphorous acid having the formula:

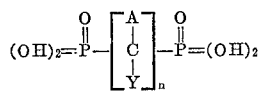

$$(OH)_2=P-\left[\begin{array}{c} A \\ | \\ C \\ | \\ Y \end{array}\right]_n -P=(OH)_2$$

wherein $n$ is an integer from 1 to 10, X is a member selected from the group consisting of hydrogen, alkyl, and halo-substituted alkyl, said alkyl group containing from 1 to 6 carbon atoms, and Y is a member selected from the group consisting of hydrogen, hydroxyl, alkyl, and halo-substituted alkyl, said alkyl group containing from 1 to 6 carbon atoms, to a substantially dry alkali metal-containing material having a particle size wherein at least 40% of all the particles remain on a No. 100 mesh U.S. Standard screen and selected from the group consisting of sodium carbonate, sodium bicarbonate, sodium sesquicarbonate, potassium carbonate, potassium bicarbonate, and mixtures thereof, to form a free-flowing granulated salt of the acid falling within the above-described formula, said acid and said alkali metal-containing material being used in an amount sufficient to provide a mole ratio of alkali metal to acid of from about 1:1 to about 4:1.

2. The process as set forth in claim 1 wherein the resultant salt is heated at a temperature in the range between 100° C. and the decomposition temperature of the particular salt formed for a sufficient period of time to form a substantially anhydrous salt.

3. The process as set forth in claim 2 wherein (a) the phosphorous acid is 1-hydroxy ethylidene diphosphonic acid which has a concentration of at least 50% by weight at 20° C.; (b) the alkali metal-containing material is sodium carbonate which is in the form of soda ash; and (c) the heating step is carried out at a temperature of from about 100° C. to about 200° C.

4. The process as set forth in claim 2 wherein (a) the phosphorous acid is ethylene-1,1-diphosphonic acid; (b) the alkali metal-containing material is sodium carbonate which is in the form of soda ash; and (c) the heating step is carried out at a temperature of from about 100° C. to about 200° C.

5. The process as set forth in claim 1 wherein (a) the phosphorous acid is 1-hydroxy ethylidene diphosphonic acid which has a concentration of at least 50% by weight at 20° C.; (b) the alkali metal of said material is sodium; (c) the sodium to acid mole ratio is about 4:1; and (d) the resultant product is the tetrasodium salt of 1-hydroxy ethylidene diphosphonic acid and is characterized by having (1) a particle size wherein less than 1% of all the particles remain on a No. 10 mesh U.S. Standard screen and at least 90% of the particles remain on a No. 100 mesh U.S. Standard screen, and (2) a pH from about 10 to about 11 as measured by the test set forth in the specification.

6. The process as set forth in claim 1 wherein the phosphorous acid is 1-hydroxy ethylidene diphosphonic acid, the alkali metal-containing material is soda ash, the mole ratio of soda ash to 1-hydroxy ethylidene diphosphonic acid is from about 3.2:1 to about 3.8:1, the ageing is for a period of from about 2 seconds to about 5 minutes and the aged mixture of trisodium and tetrasodium salts of 1-hydroxy ethylidene diphosphonic acid is heated for a period of from about 5 minutes to about 2 hours in order to remove substantially all of the water of hydration contained therein to form a substantially anhydrous mixture of the trisodium and tetrasodium salts of 1-hydroxy ethylidene diphosphonic acid, said mixture being characterized by having a particle size range wherein less than 1% of all the particles remain on a No. 10 mesh U.S. Standard screen and at least 90% of the particles remain on a No. 100 mesh U.S. Standard screen.

7. A process for preparing the tetrasodium salt of 1-hydroxy ethylidene diphosphonic acid and which process comprises the steps of (1) intermittently adding incremental amounts of an aqueous solution of 1-hydroxy ethylidene diphosphonic acid, which has a concentration of from about 50% to about 80% by weight of said acid, to a mass of substantially dry sodium carbonate material having a particle size wherein at least 40% of all the particles remain on a No. 100 mesh U.S. Standard screen at a rate sufficient to form free-flowing, solid and particulate particles of the above-described tetrasodium salt, said addition being conducted while the sodium carbonate is at least periodically agitated, and the total amount of said acid and said carbonate used being such as to provide a mole ratio of Na:acid of about 4:1; (2) aging the resultant reaction mass after each incremental addition of acid for a period of from about 2 seconds to about 5 minutes, said aging being conducted while said reaction mass is at least periodically agitated; and (3) heating the aged reaction mass after all the acid has been added for a period of from about 5 minutes to about 2 hours at a temperature of from about 100° C. to about 200° C. to form a substantially anhydrous tetrasodium salt of said acid; said salt being characterized by having (a) a particle size range wherein less than 1% of all the particles remain on a No. 10 mesh U.S. Standard screen and at least 90% of all the particles remain on a No. 100 mesh U.S. Standard screen and (b) a pH range of from about 10 to about 11 as measured by the test set forth in the specification.

References Cited

UNITED STATES PATENTS 3,214,454  10/1965  Bluer et al.
3,297,578  1/1967  Crutchfield et al.

(Other references on following page)

UNITED STATES PATENTS

| | | |
|---|---|---|
| 3,366,676 | 1/1968 | Dyer, |
| 3,422,137 | 1/1969 | Quimby. |
| 3,449,049 | 6/1969 | Ivani et al. |

FOREIGN PATENTS

| | | |
|---|---|---|
| 728,189 | 2/1966 | Canada. |
| 978,297 | 12/1964 | Great Britain. |
| 1,026,366 | 4/1966 | Great Britain. |

LEON ZITVER, Primary Examiner

J. E. EVANS, Assistant Examiner

U.S. Cl. X.R.

252—89

PO-1050
(5/69)

UNITED STATES PATENT OFFICE
CERTIFICATE OF CORRECTION

Patent No. 3,527,795          Dated September 8, 1970

Inventor(s) Roger A. Rose

It is certified that error appears in the above-identified patent and that said Letters Patent are hereby corrected as shown below:

Column 5, line 62, 4% should read 40%. Column 11, line 28, in the formula, that portion reading C A C should read C X C.

SIGNED AND SEALED
NOV 17 1970

(SEAL)
Attest:

Edward M. Fletcher, Jr.
Attesting Officer

WILLIAM E. SCHUYLER, JR.
Commissioner of Patents